United States Patent [19]

Smith

[11] Patent Number: 5,063,708

[45] Date of Patent: Nov. 12, 1991

[54] HORTICULTURAL LAYOUT GROUND COVER ASSEMBLY

[76] Inventor: Robert E. Smith, R.D. #1 Smith Rd., Verona, N.Y. 13478

[21] Appl. No.: 431,299

[22] Filed: Nov. 3, 1989

Related U.S. Application Data

[63] Continuation-in-part of Ser. No. 325,215, Mar. 17, 1989.

[51] Int. Cl.$^5$ ............................................. A01G 23/02
[52] U.S. Cl. ....................................................... 47/33
[58] Field of Search .................. 47/9, 33, 41.1, 85–87, 47/25, 32, 41.11, 30

[56] References Cited

U.S. PATENT DOCUMENTS

| | | | |
|---|---|---|---|
| 2,102,924 | 12/1937 | Thomas | 47/41.11 |
| 2,779,459 | 1/1957 | Waterman | 47/41.11 |
| 3,177,617 | 4/1965 | Koistinen | 47/41.11 |
| 3,226,881 | 1/1966 | Garrett | 47/30 |

Primary Examiner—David A. Scherbel
Assistant Examiner—Michele A. Van Patten
Attorney, Agent, or Firm—Schmeiser, Morelle & Watts

[57] ABSTRACT

A modular, foraminous ground cover for constructing custom floricultural grounds displays. Pre-shaped, fiberglass ground cover subassembly modules are provided with a plurality of discretely placed foramens which will accommodate therein the placement of seedlings or plants. The foramens are of varied sizes, with the larger susceptible of diminishment, during planting and plant growth and, enlargeable at harvest time. The subassembly modules are joinable to one another by tongue-in-groove margins that are straight edges interior of a display assembly; the outer border of the display is reinforced and is defined as its periphery. Where required for strength and pest protection, a flexible planar strip is attachable to the display periphery reinforcement and serves as an in-ground footing and rodent barrier.

5 Claims, 7 Drawing Sheets

FIG. 3a
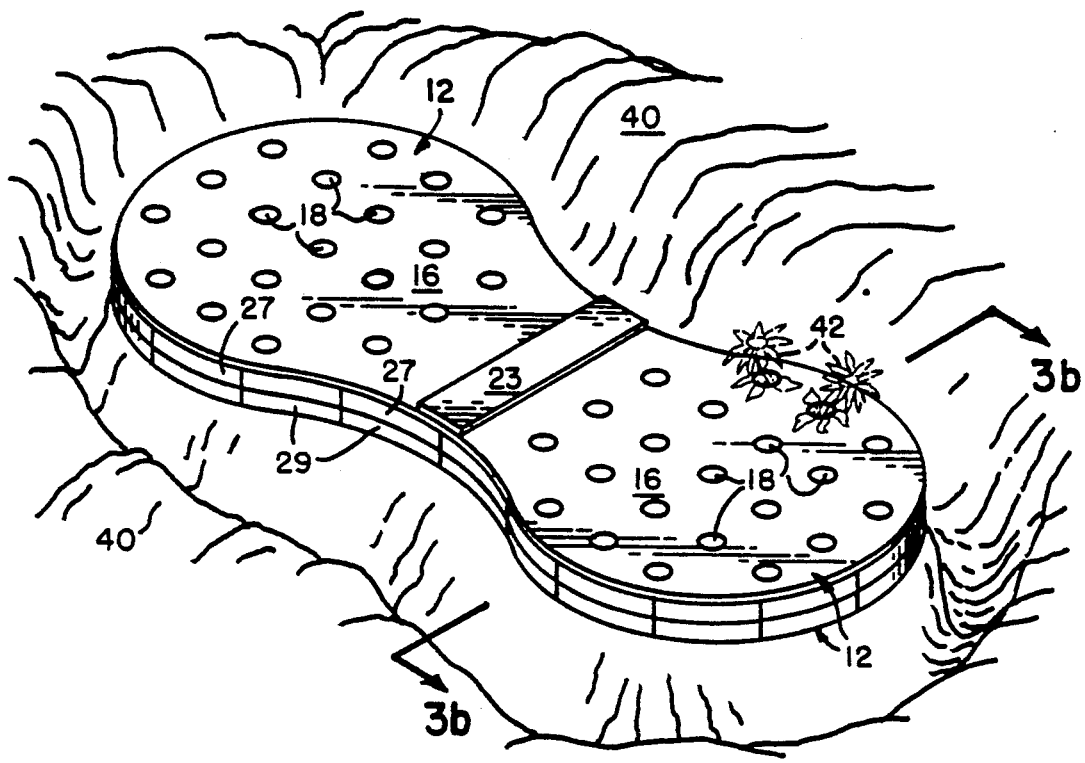
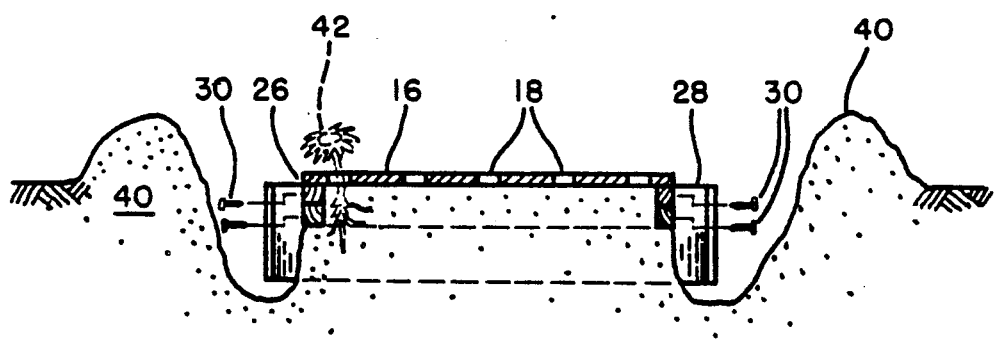
FIG. 3b

HORTICULTURAL LAYOUT GROUND COVER ASSEMBLY

This application is a continuation-in-part of pending application Ser. No. 325,215, same title, filed Mar. 17, 1989.

BACKGROUND OF THE INVENTION AND PRIOR ART

1. Field of the Invention

The present invention pertains generally to ground coverings for use in horticultural and floricultural grounds layouts and, more particularly to modular, pre-shaped ground covers that may be selectively disassembled and reassembled and, when in use, provide effective mulching for in-ground seedlings and plants while suppressing adverse weed growth.

The invention pertains further to devices which constitute in-ground barriers to burrowing rodents and other plant eating pests such as snails, slugs and the like.

2. Prior Art Discussion

The instant inventor is a protoartist in what is termed nuclear floriculture—a floricultural art which employs techniques such as the movably interlocking, modular ground cover assemblies of the instant invention. The nuclear flower gardens and other plant displays resulting from the application of the techniques and the use of the apparatus hereinafter disclosed may also be termed "interlocking gardens".

A detailed study of the prior art indicates a long and continuing search by horticulturists and floriculturists for the ideal ground cover which would provide a number of worthwhile characteristics such as: rodent and pest protection; mulching, i.e., the technique of retaining in-soil moisture and nutrients; fertilization; weed suppression; and ultimately, carefree usage while being versatile, easy to use and economically attractive. In addition to the foregoing characteristics, and perhaps most importantly, the resulting floricultural display must be very attractive, quite independent of the flora chosen, and each rendition should lend itself to a uniqueness of design.

Although observable in part, the aggregate of the aforementioned characteristics is not to be found in any of the prior art discovered by the applicant, indeed, not even in its totality. For example, one of the most relevant pieces of prior art, embodying some of the elements of the instant invention, is disclosed in the patent issued to Scharf, U.S. Pat. No. 4,268,992, for a Tree Protector. The invention of Scharf includes a hollow vertical shaft connected to an annular ground cover which is divided into two sections. The two sections are joined immovably at overlapping interior margins by screw means. Further to the Tree Protector invention is a plurality of holes in which are inserted hollow, foraminous hold-down spikes through which dissolved nutrients may be passed during the occasional watering required while using this invention. Because only one plant is meant to grown through the arrangement (up the vertical shaft), no concern is paid to design of other than circular shape of the ground cover, nor the likelihood of the movability of its two halves in relation to one another. The primary purpose of the Tree Protector is to provide a well within the annular ground cover that will collect water and divert it to the in-ground, hold-down spikes. There is no need to invite an interlocking mobility of the ground cover sections simply because, once constrained by the addition of the vertical shaft, they must be permanently and immovably secured to one another. Further, since the invention entertains usage with rooted stock (such as trees or large shrubs) there is no overriding need to "lock out" all light in order to rigorously suppress weed growth. Simply because, with rooted stock, topical herbicides may be applied to any seedling brazen enough to extend a shoot into the joined margins of the ground cover sections or through the hold-down spike holes. The invention of Scharf is excellent for fulfilling that inventor's goals and objects of invention; but, it falls terribly short of providing the aggregate characteristics so long sought by floriculturists such as the instant inventor.

An extremely clever device for suppressing ground plant growth surrounding a monument is disclosed in U.S. Pat. No. 4,317,309 issued to Sheldon and inclusive of novel means for retaining the suppression ground cover in position. This plant growth suppression device comprises a plurality of plastic shield pieces that are interconnected with each other and anchored by spikes placed into the ground around the monument base which is to remain weed-free by use of the plant growth suppression device. The lower surface of each shield piece may be formed with a pair of longitudinal retaining tracks and coupled with another shield piece by plate members that are retained within the longitudinal tracks across the interfaces between shield piece pairs. Since the spikes are pressed into the ground, they effectively anchor the plate members to the ground. Although inventor Sheldon did not suggest it, it is quite conceivable that his device, with its interlocking-through-track assembly margins, might be useful for plant growth suppression in other geometries. Its most notable disadvantages relative to the instant inventor's list of desired ground cover characteristics are: lack of rodent or pest protection; lack of means to selectively accommodate plant growth through the device; immobility between the various section of the overall assembly; inability to nurture and water the soil immediately below the device; and, general lack of the versatility needed to provide a variety of grounds displays. This latter disadvantage accrues more because the Sheldon interlock and hold-down means makes it practically impossible to easily remove a section of the total assembly without disturbing another section. As it may be seen later in this disclosure, the instant inventor avoids the problem involved with the use of complicated or contrived interlock mechanisms, as well as the immobility of such mechanisms, by interlocking his invention with conventional tongue-in-groove means, while sectionalizing any overall assembly into selectively attachable and removable ground cover panels. Any ground cover panel is connected to the overall assembly by rather conventional means—screws. Such fundamental and traditional connection means grant the instant invention a high degree of versatility and imbue the user with ultimate flexibility. The reader will come to appreciate these facts as the remaining prior art is discussed.

A most interesting use of preformed decorative patterns is revealed in U.S. Pat. No. 4,622,746 as a Guide For Decorative Grass Cutting, issued to Appelson in 1986. This patent is disclosive of means comprising a planar template cut to the contour of a desired pattern, laid upon the ground and interlocked to a series of support members that are used to support the template in the desired attitude and position. The interlock happens to be slightly movable, constrained mostly by the contour of the template, and constructed of a margin-in-hem apparatus that is somewhat analogous to tongue-in-groove mechanisms. Thus, there is embodied therein similar movable, tongue-in-groove joining mechanisms.

Other relevant art such as U.S. Pat. Nos. 3,041,781, 4,219,941, 4,308,688 and 4,648,203, issued to Richter, Hair, Revane and Worzek respectively, disclose other interesting means that serve as rodent barriers, moisture barriers or, in general, tree protectors. These patents combine previously known prior art features, yet exemplify, as late as 1987 in the case Worzek, the continuing struggles of the floriculturist to provide meaningful ground cover and weed suppression (with rodent barrier means) for the purposes of constructing grounds displays of great aesthetic value.

No matter how the very worth-while prior art features are combined, by even the most experienced floriculturist, nothing could be achieved in the way of gardening aids or adjuncts that would provide the full panoply of characteristics sought by the floriculturist and detailed earlier in this section. Rather then being impelled by the prior art to make the instant invention, the instant inventor was compelled by the growing demand for a flexible and inexpensive ground cover adjunct to make the instant invention and inculcate its features to the rest of the profession.

SUMMARY OF THE INVENTION

The means whereby the instant inventor has provided a unique solution to the problems facing the modern horticulturist or floriculturist, relative to the creation of grounds displays, consists in a ground cover assembly comprised of one or more modules having a predetermined peripheral geometry. The module further consists in a planar ground cover bearing a plurality of holes or foramens that are receptive of a wide variety of plants or seedlings. The planar ground cover comprises an opaque, water impervious unit and the hole diameters are varied according to the desires of the invention's user. The periphery of a module may be described as curvilinear, again to fit the needs and desires of the user, and is reinforced in order to provide the planar ground cover a certain degree of rigidity and marginal strength. Reinforcement may be had in a dual fashion; the first comprising an integral peripheral bead and the second comprising a multiplicity of peripheral brace or batt pairs. A rodent and pest barrier is also provided as an adjunct to the ground cover by affixing to the periphery thereof a planar, flexible sheet of water impervious material, such as plastic or fiberglass, alongside and onto the peripheral reinforcement, so as to project orthogonal to the planar cover, into the subsoil. The width of the rodent guard strip is, of course, determinable by the type of soil and the pest infestation which is to be avoided.

In a logical extrapolation of the single unit to the modular embodiment of the invention, the inventor provides a ground cover assembly consisting in two or more modules. The peripheral geometry of the aforesaid assembly may be of any desired shape and it is divided, fractioned, or modularized by the division of the planar ground cover into two or more modules, also termed subassemblies. The division is by straight cuts, hereinafter termed margins, from one point on the periphery to another. Since the entire geometry of the ground cover assembly is generally curvilinear, the divisions giving rise to the separate modules can be termed segments which result in two margins, one on each subassembly portion of the division. In order to reassemble the separate modules, a tongue-in-groove apparatus is provided. One of the margins is made so as to extend slightly, and is termed the tongue, while the other margin is afforded flat lateral strips above and below the division and effecting thereby a groove into which the aforesaid tongue may movably, that is slidably, reside. All parts of the general assembly, including the planar cover sections, the strips used to create the marginal grooves of the various modules, and the rodent barrier means and peripheral reinforecement means, may be all fixed and secured by means of traditional, non-corrosive screw assembly.

Relative to the holes or foramens in the basic apparatus, there is also provided an adjunct apparatus that is of particular interest to gardeners or horticulturists who rotate a particular "crop" and, at differing times, have differing hole size requirements. For example, if a gardener, having utilized a particular ground cover module for crops or plants having very small root systems (that allow easy removal of the entire plant system), should wish to change or rotate to another crop of which the fruit or root system is rather large (e.g., potatoes), and wish to acquire a larger hole size, the hole or foramen adjunct provides an especially attractive means of so doing. To acquire the added facility, the module must be constructed with a predetermined number of larger holes that may be either circular or quadrilaterally shaped. The foramen adjunct consists in essentially two units of generally planar geometry that are designed to fit to the module cover, the first amply covering the foramen which is to be adapted to a smaller opening. The second unit of this adjunct is attached physically to the bottom of the module cover, again like the first, completely covering the enlarged hole. By various suitable means, the top adjunct portion is physically fittable so as to fit directly to the module cover or coincide with the bottom adjunct portion that is affixed to the module cover. By proper alignment, and through use of the unique marginal projections interposed between the adjunct portions and the module cover, all sunlight is excluded from the surface of the soil directly underneath the foramen adjunct. Such an apparatus allows the gardener to trim off the upper portion of the plant to be removed, disengage the top or upper adjunct portion and gain access to the plant root system through the (original) large module cover hole.

Further non-salient paraphernalia or elements will be revealed in the following Detailed Description of the Preferred Embodiment, and the reader will gain a greater appreciation of the instant invention thereby. The reader will also come to appreciate the simplicity of the invention as well as the flexibility embodied in the concept thereof. Accordingly, it may be seen that the principal objects of the invention, that is, the incorporation of the multiple desirable characteristics first disclosed in the Prior Art Discussion, are clearly acquired by the inventor's embodiment.

BRIEF DESCRIPTION OF THE DRAWINGS

Of the drawings:

FIG. 3a is the preferred embodiment of FIG. 1 completely assembled and installed prior to backfilling;

FIG. 3b is a sectional end elevation taken at 3b—3b in FIG. 3a;

DETAILED DESCRIPTION OF THE PREFERRED EMBODIMENT

Figure 1:
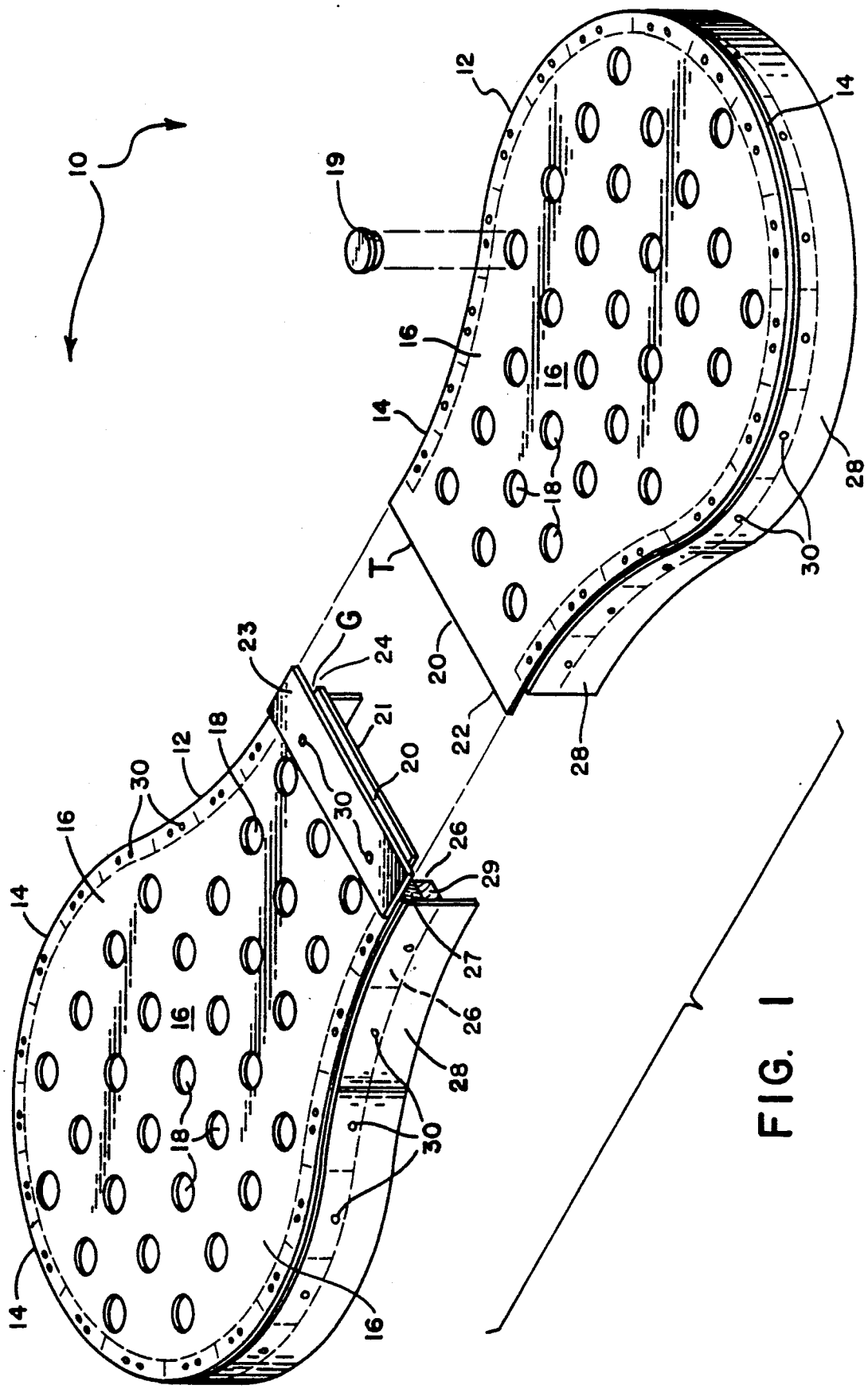
FIG. 1 is a partially exploded isometric illustration of a preferred embodiment of the invention.

At the risk of appearing pedantic, the instant inventor, having years of experience in the preparation of floricultural grounds displays, deems it necessary to reiterate the shortcomings found in the plethora of ground cover art that currently exists. Most ground cover, whether for the purposes of preparing grounds displays or for applications in general horticultural settings, such as vegetable gardens or massive plantings of row crops, consists of opaque, foraminous sections, usually strips, of water-impervious material such as polyethylene. As ground cover affording conservation of soil moisture and suppression of weeds, such apparatus are highly utilitarian. Nonetheless, their usage in grounds displays, especially such displays that entertain irregular change-out of the flora involved, are extremely limited. For example, contrast the use of black polyethylene strips that are used in the home vegetable gardens to support the growth of, say, tomato plants. The gardener begins by preparing the soil and dispersing into it fertilizer and nutrients, including a good deal of mulch such as peat moss. Then a ground cover of black polyethylene is laid down and secured by one or more of several known methods. Holes are either precut in the polyethylene (or, now made) prepatory to the insertion therein of plant seedlings. Thereafter, all the gardener must do is periodically water the tomato plants and rely upon the dark ground cover to retain moisture, suppress weed growth and retain subsoil heat to further the growth of the plants. In contrast, the floriculturist, in preparing a grounds display, faces two problems which cannot be readily solved by the use of the vegetable gardener's ground cover. Where the gardener may allow his plants to grow full term, the floriculturist is faced with a never ending requirement to change out portions of grounds displays, and is further required to re-treat the subsoil, depending upon different flora implantings that are entertained during the term of the overall display. Thus, the floriculturist must have an apparatus that will allow him or her to disassemble part of the ground cover, remove and replant, while conditioning the subsoil with a different chemical and/or moisture protocol. Additionally, the floriculturist, because of the wide variety of flora and the likelihood of the grounds displays being an integral part of grounds treatment in general, must be prepared to face a wide variety of plant pests such as moles, snails, cut worms and the like, as well as be required to treat other portions of grounds display such as by cutting grass and trimming, right up to the interface of lawn and floricultural display. The instant invention provides an answer to the floriculturist's problems, as detailed above, by providing a modular ground cover comprising one or more subassembly modules having therein discretely placed foramens to accommodate the placement of seedlings or plants. Further, one or more subassembly modules are joinable to another, or a plurality of others, by use of tongue-in-groove margins that are straight edges and interior of the periphery of the complete display assembly. Tongue-in-groove margins are employed because such will allow the joining of one subassembly or module to another and yet allow for the movement of one module with respect to the other, without breaking the ground cover to allow penetration of sunlight that would surely cause the germination and the nourishment of unwanted flora within the display proper. Where additional strength is required in order to work about the display, say for example in running a lawn mower onto the periphery of the ground cover assembly, a strengthening bead (integral with the periphery), or peripheral braces are employed to give the ground cover assembly the requisite strength. Accordingly, if pest protection such as a barrier to moles is required, a flexible planar strip is attached completely about the display periphery to the very means which are used to strengthen that periphery, thus serving as both an in-ground footing and rodent barrier.

Having described the invention apparatus in view of the benefits of such, a clearer detail shall now be provided with reference being had to the drawings herein. With particular reference to FIG. 1, there is disclosed a partially exploded isometric illustration of the invention in a preferred embodiment that incorporates all elements necessary to achieve the fullest utility contemplated by the instant inventor. The entire ground cover assembly 10 consists of one or more modules 12 that have the defined geometry that is required to effect the final floricultural display. The border of the preferred geometry is known as the periphery 14 and is exemplified herein as a stylized figure "8" pattern. The pattern is, in this instance, divisible or separable along a margin 20 which consists of any straight cut, within the periphery 14 of the ground cover assembly 10. Divisions of any ground cover assembly are made for the sake of expediency and are determinable upon consideration of several factors such as: size of the assembly 10; ease of handling desired by the user; design or geometry of the grounds display; weight of the materials being used to effect the opaque ground covering; and strength required of the overall assembly.

The more readily noticable aspects of the assembly 10 consist of a shaped, planar cover 16 which is composed of an opaque, water impervious and chemical resistant material such as fiberglass. Those of ordinary skill will recognize that many materials are readily available on today's market that would suffice, having the requisite durability, strength, opacity and chemical resistivity that are needed for in-ground placement or ground contact. The planar cover 16 may be molded or cast or, in some instances, cut from existing sheet goods to the desired geometry that would be necessary to effect a desired grounds display. The planar sheet may be cut in a single piece or, preferably, in several modules providing that each module has at least a straight margin 20 for joining to another straight margin of the module to which the first is to be joined. The inventor's insistence on straight margins 20 is quite practical in that, upon joining the modules or subassemblies 12 together to effect the full ground cover assembly 10, the user must insure that the integrity of the opaque ground cover 16 not be disturbed at any time during the life of the grounds display. By integrity it is meant herein that at no time will a crack or fissure appear in the planar covering 16, save the intentional openings to be hereinafter discussed, that would allow the penetration of sunlight to the subsoil. To this end, the margins 20 shall be joined with a unique slidably engaging, movably interlocking apparatus.

Continuing now with the description of the remaining elements in FIG. 1, there is seen at multiple locations, which are determined by the floriculturist, a plurality of foramens or holes 18 effecting an overall ornamental design. Should any of the holes later not be needed, specially designed plugs 19 (or bungs) are inserted into any hole which is to remain unused. The plug 19 is of the bung type that may be firmly pressed into the hole 18. An alternate embodiment would be the muffin-type plug which has a cap over the top of the bung portion so as to insure the exclusion of light, yet provide a means for ready removal by merely grasping the muffin-like top. Relative to the aforesaid slidably engaging, movably interlocking apparatus along the margins hereof, there is shown an extension 22 of the right hand subassembly 12, denoted T and termed by the inventor a tongue. The tongue 22 may be merely an extension of planar cover 16 along margin 20 or it may be a separate adjunct which has been attached to the cover. Receptive of the tongue 22 is a groove denoted herein as item 24. The groove 24 is created by affixing to the margin 20 of the left hand subassembly 12 a planar strip 21 below the module's planar cover 16 and another planar strip 23 above and affixed to the planar cover 16 parallel to strip 21. The planar strips 21, 23, held in a stand-apart registry by the intervening margin 20, of the left hand subassembly 16, effectively presents a groove 24 receptive of tongue T (22). Finally, about periphery 14, beneath cover 16 and exclusive of marginal areas 20, a reinforcement is provided to the ground cover 16 which is either integral with the ground cover or separate therefrom and fabricated on an ad hoc basis. In the former case, a reinforcement bead (not shown in this illustration) is formed at the same time the module cover is constructed. The bead is given a thickness sufficient to reinforce the periphery 14 while concurrently accepting a rodent guard 28, generally attached by means of screws 30, so that the guard which is a flexible, planar strip of material similar to the planar cover 12 projects downward, essentially orthogonally, into the subsoil, thus providing rodent barrier means, as well as the strength-giving, in-ground footing. The second, ad hoc construction that provides the same peripheral strengthening and rodent barrier 28 affixing means, comprises pairs 26 of wooden braces that are screwed to the ground cover subassembly cover 12 about the complete periphery 14 thereof. The paired or stacking arrangement allows the upper member 27 of the pair 26 to be affixed by screws 30 to the planar cover 16, and thereafter by screws 30 to the lower member 29. The rodent barrier 28 is then affixed to either (or both) of the braces 27, 29 in the brace pair 26. The reason for this construction is that it provides an expedient solution to the problems of replacing portions of the planar cover 16, replacing portions of the rodent barrier 28 and changing or replacing portions of the groove 24 apparatus at planar strips 21 and 23. For example, should a portion of ground cover subassembly module 12 planar cover 16 be damaged, it may be unscrewed by removing screw fasteners 30 and lifted off peripheral reinforcement 26 or rodent barrier 28, depending on whether it be of the integral bead type (not shown) or the paired brace type 26. Should the user desire to block any of the foramens 18, it is only necessary to insert plugs 19 to effect the integral opacity found in the remaining portions of module 12 planar covers 16. A distinct advantage to the paired brace 26 type of reinforcement and rodent barrier attachment is the allowance of some slidable movability between brace 26 members 27, 29. This assures that the connection between planar covers 16 and in-ground footing (rodent guard 28) apparatus is not completely rigid, therefore minimizing the likelihood of peripheral cracks and violation of the pest-rodent guard barrier. The reader, having been apprised of the salient elements of the instant invention, is now aware of the broad utility afforded by it for the purposes of acquiring unique grounds displays. The modular approach, which may be readily iterated by the user, even to the extent of closing or opening existing foramens to accommodate more or less of the selected seedlings or plants, cannot go unappreciated. Practically any grounds display design may be entertained by the floriculturist or gardener since any geometry may be segmented into a plurality of modules with the resulting segment margins adapted with the tongue-in-groove (T-G) apparatus of the instant invention.

Figure 2B:
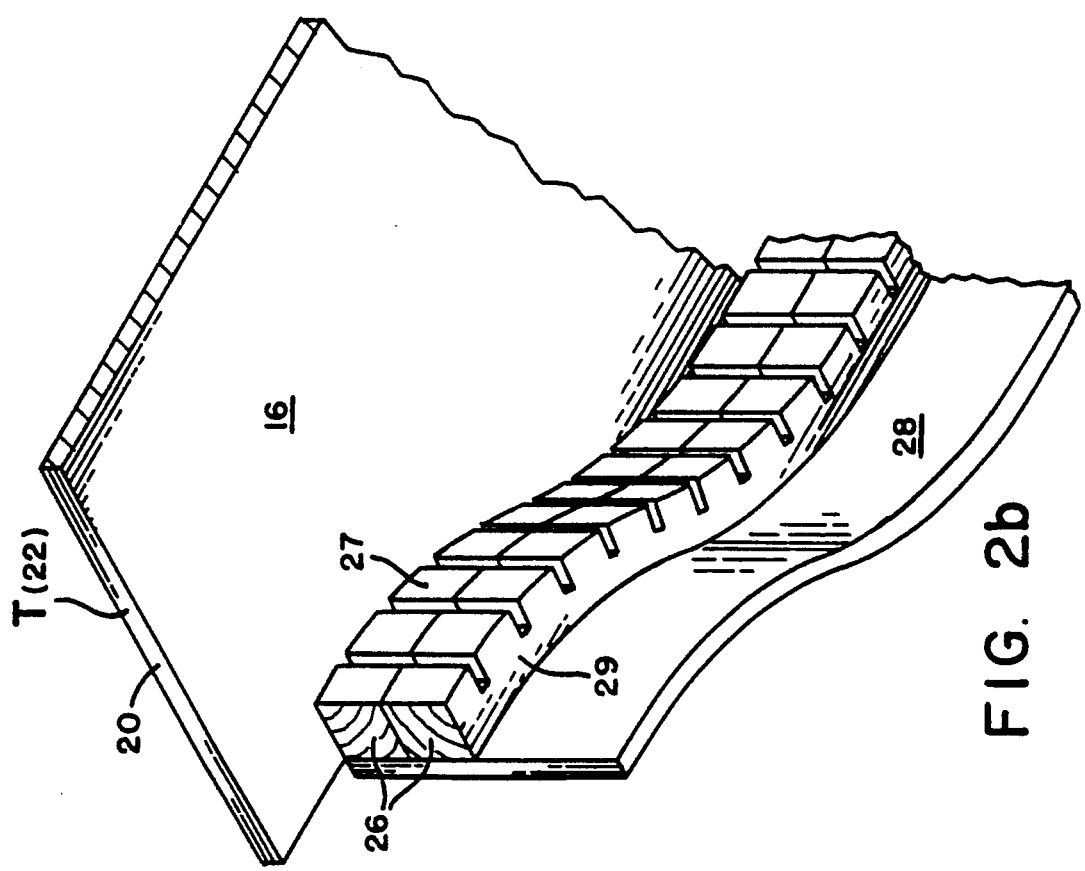
FIG. 2b is a section of the FIG. 1 embodiment directly opposite the section disclosed in FIG. 2a and seen from beneath the object.
Figure 2A:
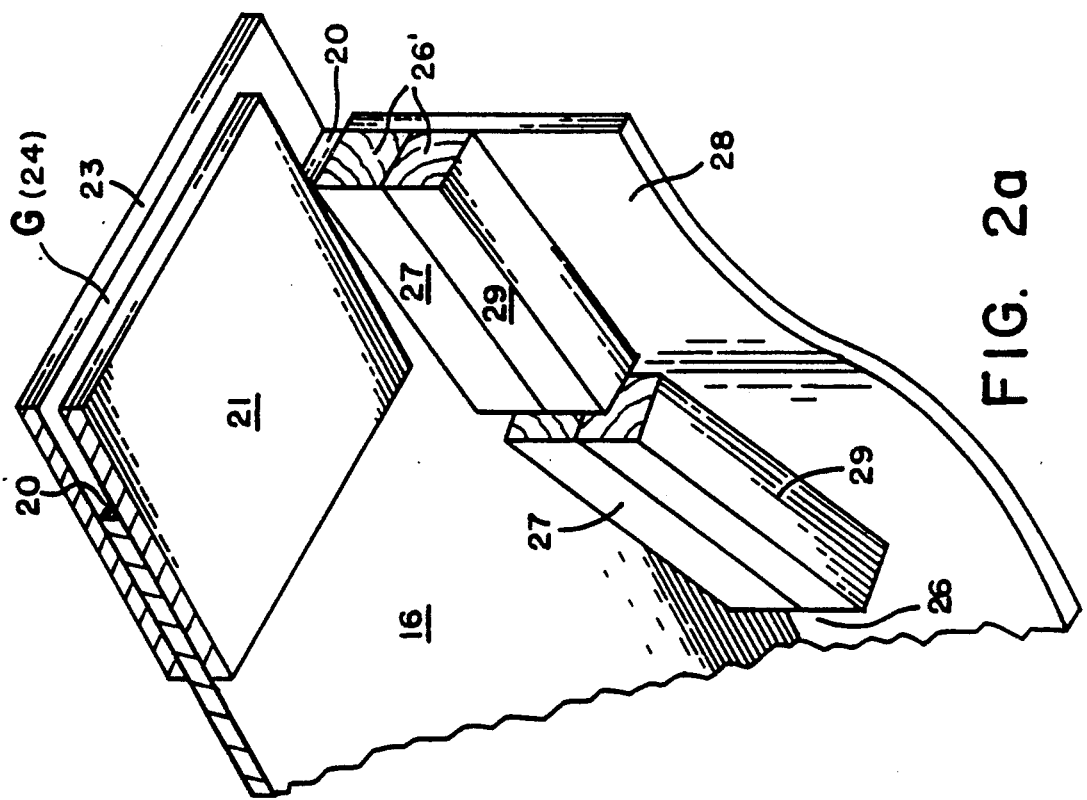
FIG. 2a is a section of FIG. 1 taken proximate the area G and as viewed from beneath the object.

The groove 24 details that are referred to as G, as well as the tongue 22 details referred to a T in FIG. 1 are displayed in greater detail in FIGS. 2a and 2b. It may be readily seen in FIG. 2a that the margin 20 does not extend beyond the braces 26 as far as that of FIG. 2b. When the planar cover 16 is first divided along margin 20, the bracing in this embodiment is yet to be affixed to the planar cover 16. After the division is made, groove 24 is created by the addition of strips 23 (at the top of) and 21 (beneath) margin 20 as depicted in FIG. 2a. Thereafter, braces 26, at least the upper member 27, are affixed to the planar cover 16 by screw 30 means (not shown). Lower brace members 29 may be affixed to upper members 27 just prior to attaching rodent guard 28, should such be desired. Referring now to FIG. 2b, it is better understood why tongue 22 appears to exist as an extension of planar cover 16 at margin 20. In reality, bracing 26 is placed so that it will abut bracing 26' directly below groove 24, as seen in FIG. 2a. Thereafter, if desired, rodent guard 28 may be affixed to the bracing strips as previously detailed in FIG. 2a. It is noteworthy to point out the difference between the bracing systems in FIG. 2a and FIG. 2b. The kerfed strips of FIG. 2b are merely a different wood worker's application of the principles articulated above; such wood working detail in the realization of the braces is left to the choice of the individual user.

As with many inventions that are useful for blending the skill of a worker with the art of a craftsman, there exists a particular procedure for installation of the instant invention that will produce the most favorable and aesthetic results. Particular reference to FIG. 3a discloses a ground cover assembly 10 comprised of two modules 12 as it would appear installed over an area of pretreated soil. For the sake of illustration, the instant inventor shall now explain how a grounds display of flowers, say of the composite type such as marigolds or mums, may be constructed. The soil is first worked and the requisite nutrients and moisture conserving materials, such as peat or vermiculite, are added and worked into the soil. It is leveled and the modules 12 are assembled over the treated and leveled soil area. Great care is exercised in the mating of the two modules, assuring that the top strip 23 of the grooved margin covers the tongue portion (not shown) of the second module, completely. In FIG. 3a, the modules are shown installed with upper batten 27 and lower batten 29 members of peripheral reinforcement braces already installed. For the sake of clarity the size of the braces has been exaggerated. The foramens 18 which will used as receptors of seedlings and plants 42 are shown open to the underlying and treated subsoil. A trench has been formed around the display with the overburden 40 pulled back slightly so as to allow access and fixing of the rodent barrier. FIG. 3b is an end sectional view taken at 3b—3b of FIG. 3a. In this sectional view the overburden 40 appears less exaggerated and in the proportions that it will usually exist. The reader may note that planar cover 16 is pressed down to the ground and peripheral braces 26 already form a fairly sturdy footing. At this point in the installation, rodent barrier 28 is installed around the peripheral brace 26 structure by use of screws 30. After the installation of the rodent barrier, overburden 40 is pushed back into the trench and the surrounding soil is leveled so that it is just slightly above or flush with planar cover 16. Immediately thereafter, seedlings or plants 42 may be implanted through foramens 18. It is interesting to note that the instant inventor's fixing means, ordinary corrosion resistant screws 30, is of high utilitarian value. Practically every element that has been used to effect the total ground cover assembly (with rodent barrier) is selectively replaceable: planar covers 16; groove-acquiring strips 23, 21; reinforcement braces 27, 29 and rodent guard 28.

Figure 4:
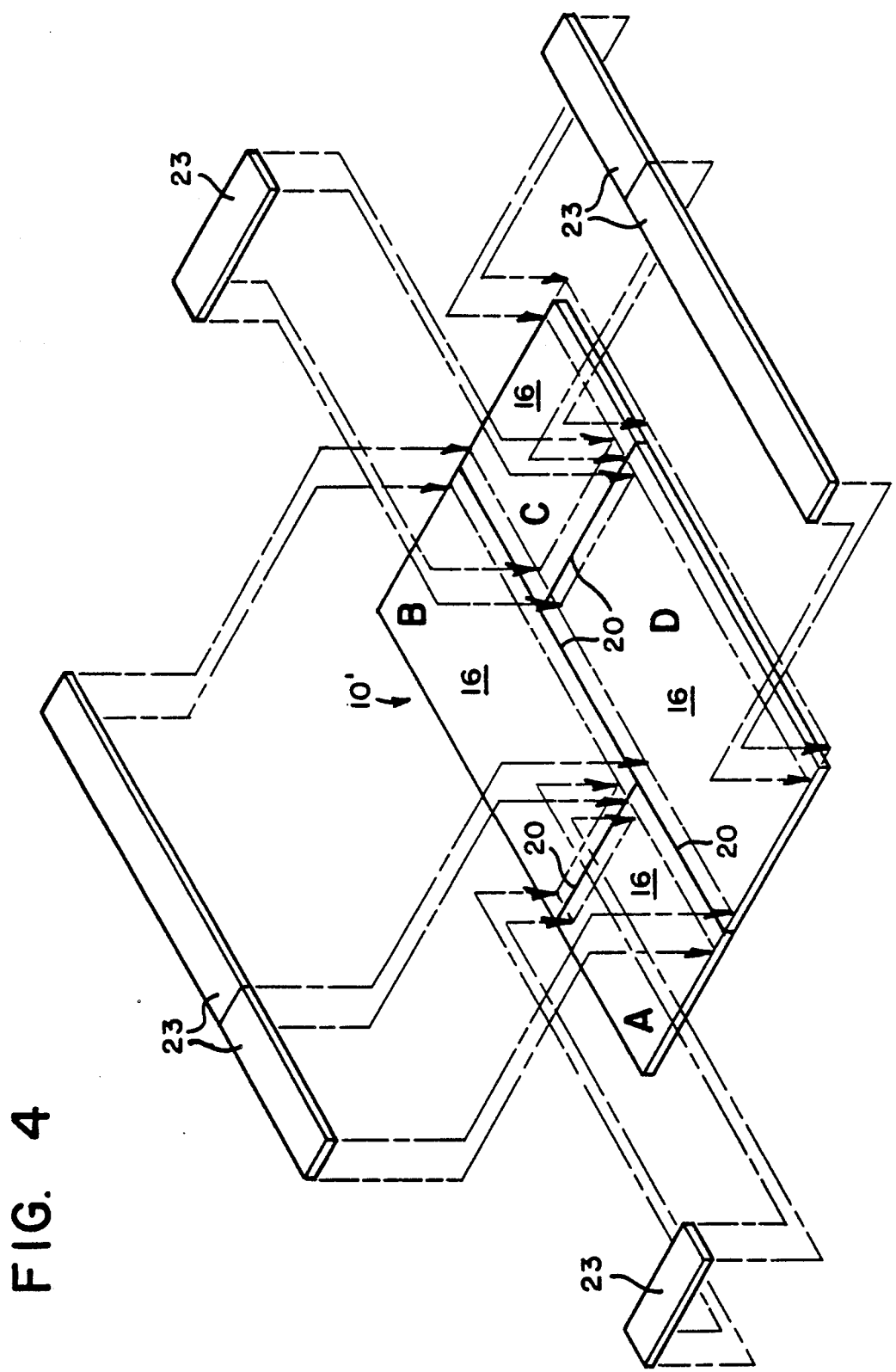
FIG. 4 is an exploded illustration depicting top planar marginal element installation used in attaining a mechanization of the groove apparatus in the invention.

Although every aspect of the instant invention has been disclosed and thoroughly discussed, the instant inventor is desirous of pointing out how the fabricated groove assembly may be used to great advantage. To this end, reference is made to FIG. 4, a rectangular ground cover assembly 10', sans foramens. The subassemblies are denoted A through D clockwise from the nine o'clock position. For the sake of clarity, articulation of the placement of lower groove strips 21 will not be made and only the placement of upper groove strips 23 shall be suggested. Those of ordinary skill, having practiced the invention will become adept at selecting groove strip placements to suit their own particular needs. The groove strip 23 between the juncture of subassembly A and B is attached on the B side. The strip between A and D subassemblies is affixed to the A subassembly while the strip between B and D and B and C is affixed to the B subassembly margin. The strip covering the margin between C and D is attached to the D subassembly and finally, the margin extensive of subassemblies C and D bears the separate groove strips by attachment to the subassemblies C and D, respectively. Lower groove strips 21 are generally placed on the margin 20 directly below the respective upper strip 23; however, it is not necessary that the lower strip be as extensive as the upper strip provided the particular matching of subassemblies is done so as to prevent the slightest sunlight penetration in the event the subassemblies move with respect to each other. Normally, the inventor has observed movements of subassemblies up to one-half inch, and movements up to one inch should be anticipated. Irrespective of the amount of movement anticipated, the groove and tongue strips may be readily engineered to such required lengths and widths. The only limiting factor on the width of tongue and groove strips appears to be the center-to-center location of the various foramens.

Having carefully defined the basic invention comprising the modular, foraminous ground cover composed of a cover portion with discretely placed foramens therein, with special tongue-in-groove margins for multiple modular connection, it is now appropriate to take up the disclosure of the very valuable foramen adjunct of the invention. As earlier pointed out, the average gardener may desire to plant a variety of crops ranging from those such as green beans or carrots in which the root stock may be readily removed through the generally smaller type hole in which the seeds were originally planted, to tuberous or large rooted crops (or plants), the root system or crop product which has greatly exceeded the size of the hole originally used for planting or setting. It is apparent, therefore, that in order to practice the invention and yet enjoy crops of the latter-described nature, rather large holes or foramens must be provided at harvest or plant removal time. But the purpose of the present invention is to provide a complete ground cover that will exclude sunlight and entrap ground moisture over the preponderant surface of the garden or floral plot. Thus, the ultimate goal is inconsistent with the requirements of the aforementioned gardener unless the gardener decides to crop the exposed, above-ground plant portions and completely remove the planar cover 16 of the invention. FIGS. 5–13 serve to illustrate and teach a suitable alternative to the dismemberment of the invention in such a case.

Figure 5:
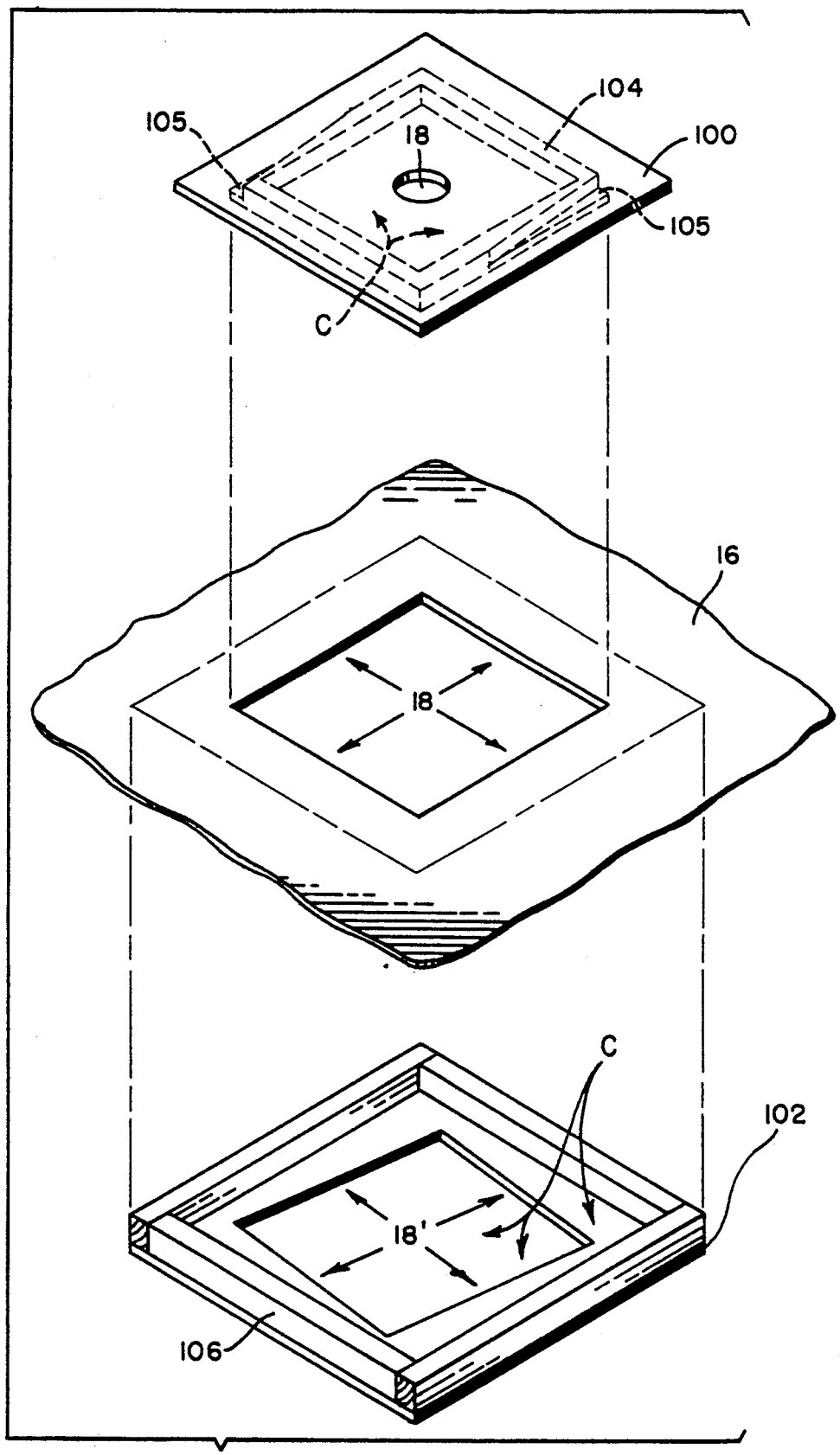
FIG. 5 is an exploded illustration depicting both portions of the foramen adjunct poised for positioning on the module cover.

Referring more particularly to FIG. 5, there is illustrated, in exploded view, the foramen adjunct upper plate (top) 100 poised above square shaped foramen 18 in modular cover 16, and the correlative bottom plate 102 spaced below cover 16, and in alignment with adjunct top 100. In the preferred embodiment, bottom plate 102 is rigidly affixed to the bottom of planar cover 16. If the foramens 18, 18' are not circular, but rather square or rectangular (as herein depicted), 18' will be marginally aligned with 18. The reader should understand that the practice of the invention is not restricted by the foramen shape so much as it is by the size. Thus, when top plate 100 is placed down on planar cover 16, its inner marginal projection 104 passes through planar cover 16 foramen 18 and into a chamber C formed by the top plate 100, the foraminous bottom plate 102 and the outer marginal projection 106 of bottom plate 102. By manipulation and use of hereinafter disclosed attachment means, top plate 100 is secured in registry with bottom plate 102. Now, to the above-ground observer, the integrity of planar cover 16 is violated only by the circular hole 18 in top plate 100 of the foramen adjunct apparatus. Those of ordinary skill see how the invention is initially practiced as detailed in the first portion of this description by planting a seed or plant set through small, circular foramen 18 in top plate 100 and allowing it to be warmed by the moist, heated conditions enclosed within the chamber C formed by top plate 100, bottom plate 102 and the completely adjacent marginal and peripheral projections 104, 106 of the respective top and bottom plates of the foramen adjunct. When the plant having a larger root system than normal is to be harvested, its upper plate will be cropped and foramen adjunct top plate 100 will be disengaged from the modular cover and adjunct lower plate 102, exposing the larger foramen 18'. The tuber or root stock of the plant may now be removed without disruption of the basic ground cover ensemble.

Figure 8:
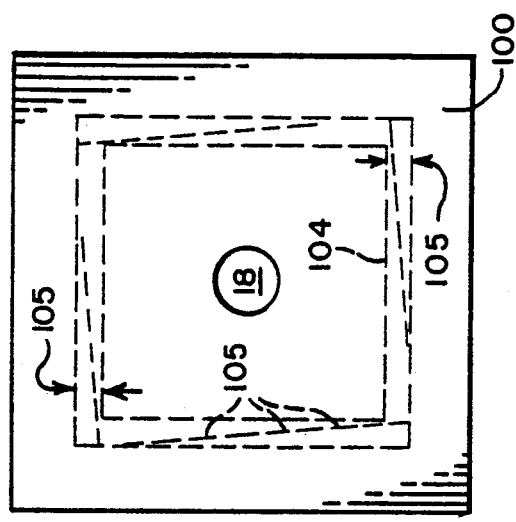
FIG. 8 is a top view of the top plate of the foramen adjunct.
Figure 6:
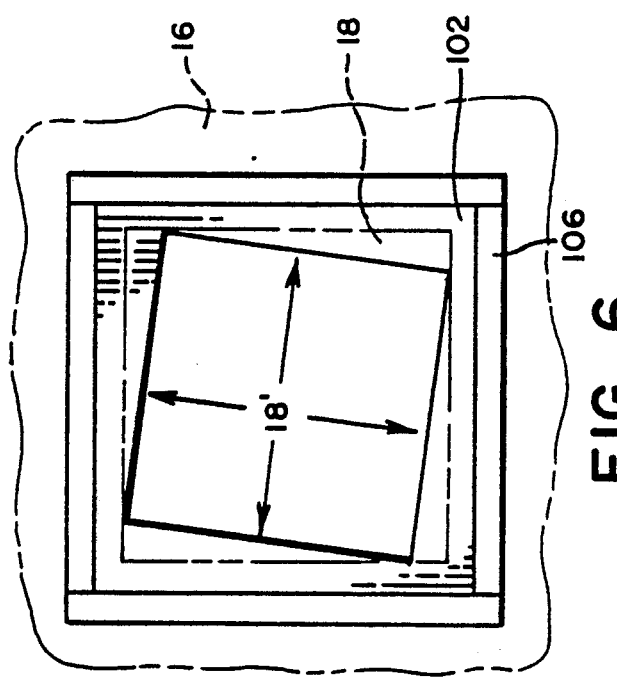
FIG. 6 is a top view of the bottom plate of the foramen adjunct.
Figure 7:
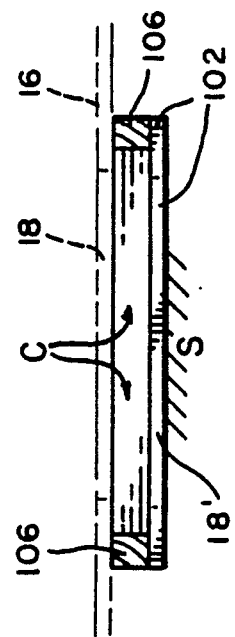
FIG. 7 is a side elevation of the FIG. 6 apparatus.

In the remaining drawings, FIGS. 10-13, two embodiments of the foramen adjunct used with the instant invention shall be discussed and detailed. The first, a construction readily obtainable by the craftsman is taken up in FIGS. 6-9. It is this embodiment which requires little more than plate elements 100, 102 on which are placed marginal or peripheral projections 104, 106. Those of ordinary skill will recognize that the plates may be comprised of any rigid, planar, water impervious material; while extensions 104 and 106 may comprise ordinary wood slats that are fixed or adhered to their respective plates. The instant inventor, with this particular embodiment, constructs the bottom plate 102 after the fashion disclosed in FIG. 6. FIG. 6 is an illustration of the bottom plate as seen through the modular planar cover 16, which is illustrated in phantom outline. From this view, the most predominant features are the peripheral or marginal projection 106, bottom plate 102, and the foramen 18' of bottom plate 102. In phantom are seen modular cover 16 and square-shaped foramen 18 located in the modular cover. Use of the square-shaped foramens limits the user somewhat in that a larger foramen 18 is required in the modular cover 16 so as to properly encompass the purposefully canted foramen 18' of the bottom plate 102. Reasons for the canting of foramen 18' will be better understood during the description of FIGS. 8 and 9. The side elevation of the FIG. 6 apparatus serves to further instruct the reader in the simplicity of this construction. The reader should note the formation of chamber C that is formed between the soil (S)-enclosed lower plate 102, marginal projections 106, modular planar cover 16 and, ultimately, top plate 100 (not shown). The chamber C forms an environment that is conductive to the seedling's or plant's growth during the early spring. It retains warmth from the radiation that impinges on top plate 100 and modular cover 16, as well as the moisture emanating from the ground S. Further, any liquid nutrient entering from the top plate 100 is dispersed over the soil S that shelters the seedling, while any condensation is collected on bottom plate 102 top surface and dispensed along the margins of foramen 18'. FIG. 8 illustrates the top plate 100 with its projection 104 parallel to, but inside the top plate's edges. Top plate projection 104 is constructed so that it will fit precisely through modular cover 16 foramen 18; and hence, in this illustration, it is depicted as having essentially the same external dimensions as the foramen 18 shown in FIG. 6. In the normal mode of operation, plate 100 is fitted over foramen 18 and projection 104 is passed down through it so as to place projection 104 inside and essentially adjacent (but not marginally parallel) to projection 106 of bottom plate 102. Thereafter, it is necessary to securely clamp top plate 100 to module cover 16. This is done using the kerfs 105 of projections 104 by rotating plate 100 so as to engage the edges of cover 16 within the diagonally cut kerfs 105. This is an old cabinet making technique that is adopted for the first time in the construction of rigid ground covers. It is simple, inexpensive and is regarded as elegant. Those of ordinary skill will readily recognize the fact that the top and bottom plates need not be of square or rectangular shape. Such can readily be said of foramens 18 and 18'. Further, those of ordinary skill will readily recognize that other means are available for acquiring the environmental chamber C and for thereby attaching bottom and top plates 100 and 102 so as to catch modular cover 16 therebetween and yet, be fixed in stand apart registry. As a means of illustrating the aforesaid conclusion, the instant inventor further offers the foramen adjunct with apparatus of an alternate embodiment in FIGS. 10-13.

Figure 9:
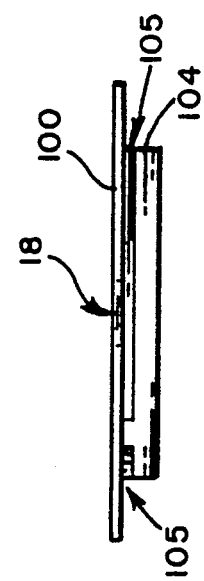
FIG. 9 is a side elevation of the FIG. 8 apparatus.
Figure 10:
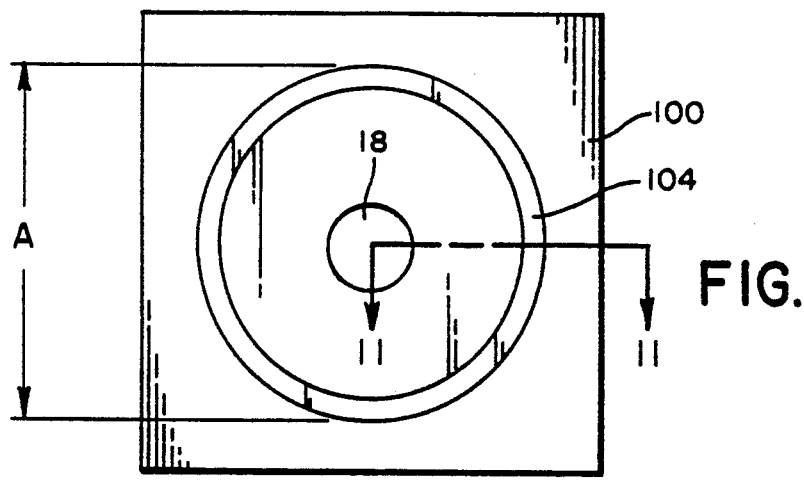
FIG. 10 is the bottom view of the top plate of the foramen adjunct apparatus in an alternate embodiment.
Figure 11:
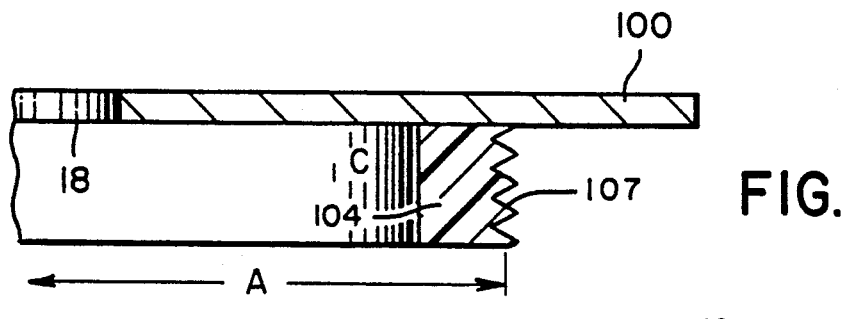
FIG. 11 is a partial side elevation of the FIG. 10 apparatus taken at 11—11.

For the sake of expediency, the following diagramatic analogs are noted: FIG. 10 is the analog of FIG. 8, FIG. 11 of FIG. 9, FIG. 12 of FIG. 7, and FIG. 13 of FIG. 6. Referring more particularly to FIG. 10, there is seen, from the bottom view, top plate 100, foramen 18, and circular projection 104 (instead of quadrilateral), having external diameter A. FIG. 10 is sectioned at 11—11 and is further referred to in FIG. 11. FIG. 11 is a side elevational, sectional illustration depicting projection 104 which, as noted from above, is circular. At the outer edge of projection 104 appears a threading 107 comprising at least one small portion of projecting means that may be engaged by a bottom plate mechanism 102, 106 so as to secure top plate 100 to the remaining foramen adjunct ensemble.

Figure 12:
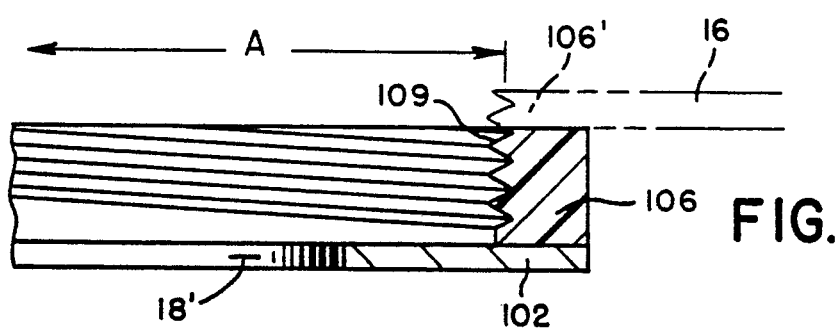
FIG. 12 is a partial side elevation of the bottom plate of the foramen adjunct, alternate embodiment correlative to FIG. 11.
Figure 13:
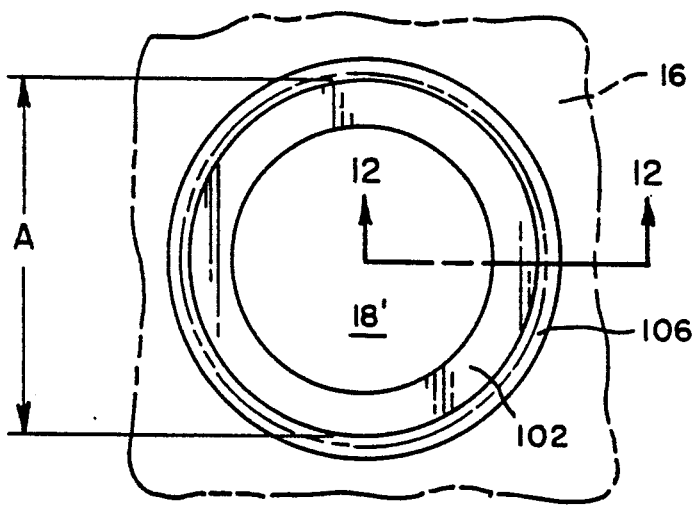
FIG. 13 is a top view of the bottom plate of the FIGS. 10-12 foramen adjunct apparatus.

Briefly skipping over FIG. 12 and moving to FIG. 13, the analog of FIG. 6, the adjunct bottom plate 102 is depicted, again with its peripheral projection 106, its relationship with planar cover 16 and foramen 18', which is in contact with the soil S (not shown). FIG. 13 is sectioned at 12—12 and depicted in orthographic relationship immediately above it as FIG. 12. Reference to FIG. 12 discloses to the reader, in partial cross section, projection 106 with (in this case) internal threadings 109. The internal diameter of threadings 109 is A, so as to engage the external threadings 107 of top plate 100 projection 104. The reader may now imagine the total assembly by concurrent reference to FIGS. 11 and 12, noting the permanent fixture of bottom plate 102, through its internally threaded projection 106 to modular cover 16 and the threadable insertion of top plate 100 into it so as to form chamber C between plates 100, 102 and at least one projection (in this case 104) of the adjunct ensemble. Again, routineers in this art may readily see that other means are available for effecting the incubation chamber C along with the foramen adjunct.

Where, in certain instances, it is not necessary to acquire chamber C, the moisture-entrapping, light-excluding advantages of projection 104/106 may be acquired by eliminating bottom plate 102 and utilizing only top plate 100 with a portion of projection 104. If the kerfed version of FIG. 9 is employed, kerfs 105 may be used to engage the edge of planar cover 16 in the manner previously described. If the alternate embodiment of FIGS. 10-13 is desired, and bottom plate 102 ensemble is deleted, the edge of foramen 18 in modular cover 16 may be either grooved 106' or beveled (in a "V" shape) and be as readily engaged by threads 107 of top plate 100 projection 104 as by threads 109.

From the experience of the instant inventor, it is known that the inveterate floriculturist or gardener may make valuable and extensive use of the instant invention at a notable savings in the expense of nurturing floral beds or gardens. Considerable savings may be realized in the usual expenditures for fertilization, weed suppression and irrigation. Those well practiced may readily discern alternate means for embodying the principles taught herein; and practice with the invention should imbue them with an extensive amount of skill in its application. Different physical arrangements and readily available means of reinforcement or attachement will most likely be suggested by other practitioners; such alternatives are considered to fall readily within the scope of the present invention and are considered to be secured by the claims hereinafter appended.

What is claimed is:

1. In a foraminous, opaque and water impervious ground cover having therein a plurality of essentially square foramens which communicate with all ground under said cover, the improvement for acquiring and later dispensing with a foramen diminishing and closing feature comprising a completely foramen-covering, removeable and sealably attachable top plate of opaque, water impervious material alternately having a small top plate hole therein and which communicates with the ground through the foramen, said plate of sufficient area to be superpositioned on and overlappingly cover the foramen of said ground cover which is to be diminished in size or closed and later reacquired by detaching said plate from the cover, said plate possessing a continuous essentially square top plate projection means depending from one surface thereof, said top plate projection means being of slightly smaller periphery than said foramen so that it will fit closely through the foramen, and said top plate projection further having therewith fixing means for removably securing said top plate to said ground cover, said fixing means comprising a groove in at least two opposing corners of said top plate projection at a juncture with said top plate surface and receptive therein of edges of a foramen.

2. The invention of claim 1 further comprising a second plate generally configured as said top plate with a second plate hole therethrough at least as large as said top plate hole, when used, and an external marginal surface projection means at least conterminous with the foramen, attachable to an undersurface of the ground cover and receptive therewithin of the top plate projection means so that said second plate is disposed essentially in registry with the top plate, thereby allowing the top plate projection to be rotated within said marginal surface projection of said second plate.

3. The invention of claim 2 wherein placement of said top plate in registry with said second plate defines a cavity therebetween.

4. The invention of claim 3 wherein said groove runs essentially the length of a projection side.

5. The invention of claim 3 wherein said groove is situated in all corners.

* * * * *